Jan. 9, 1951  B. G. COPPING  2,537,121
TEMPERATURE REGULATING SYSTEM
Filed May 12, 1947  2 Sheets-Sheet 1
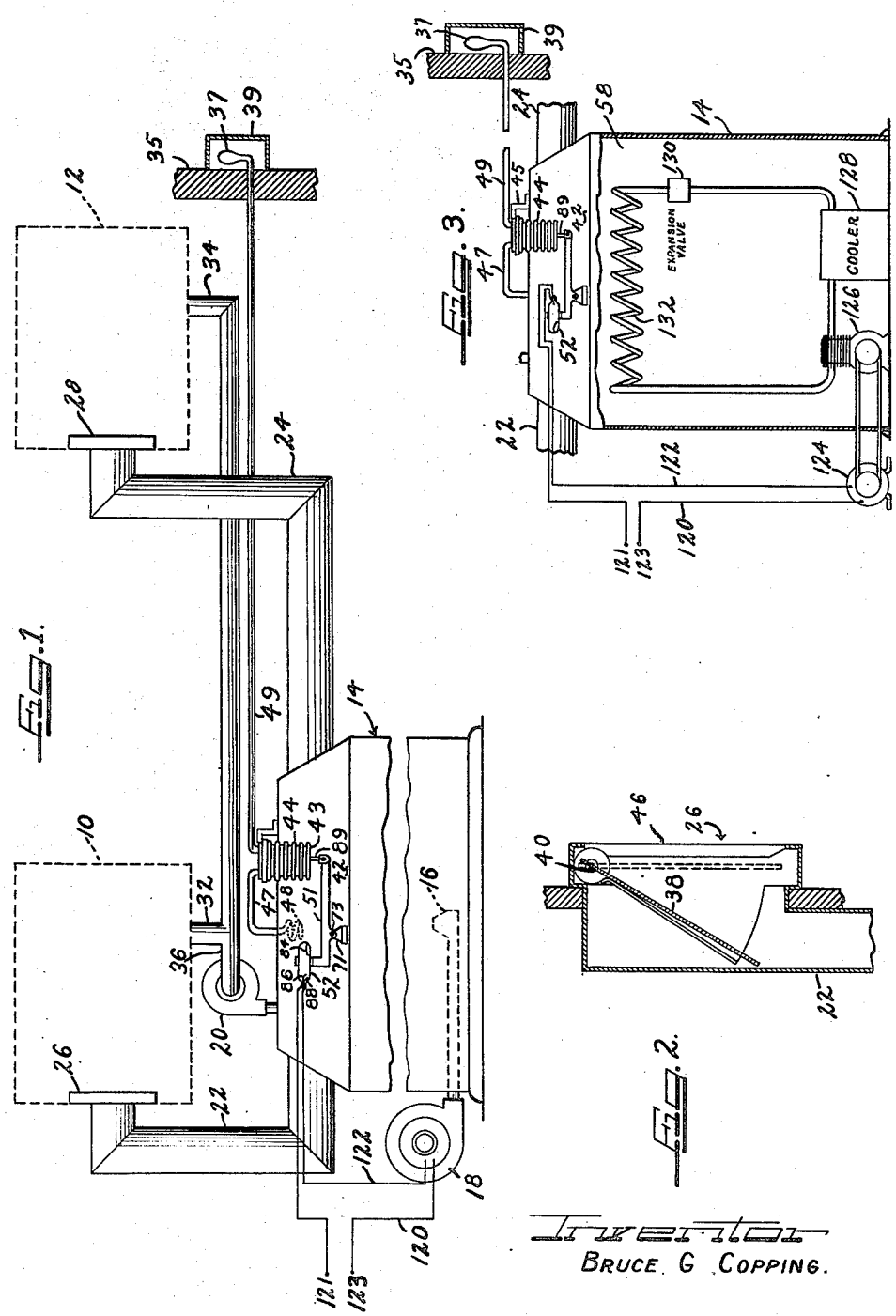
Inventor
BRUCE G COPPING.

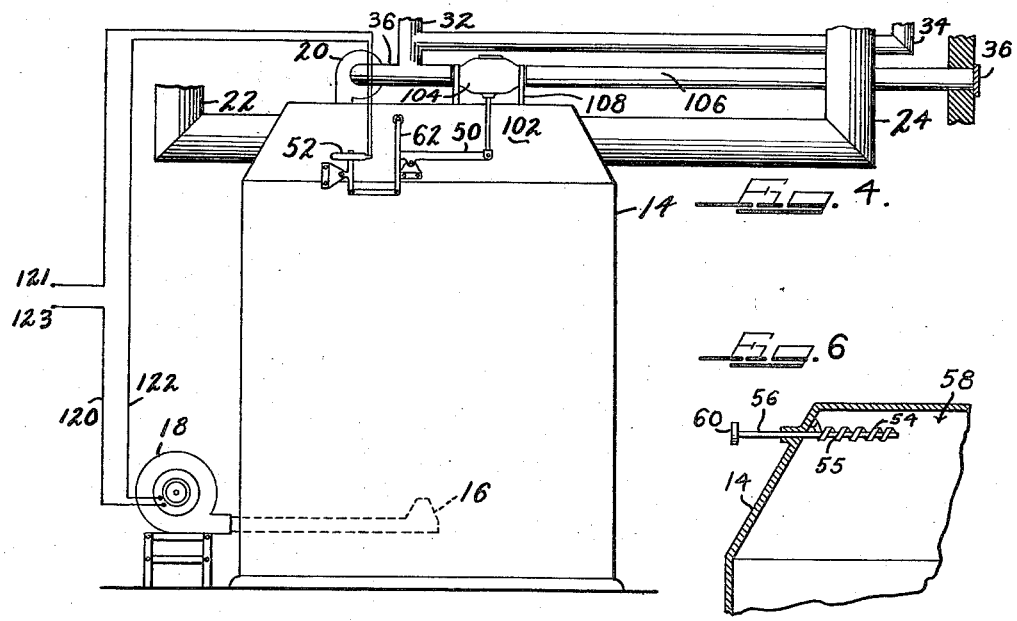
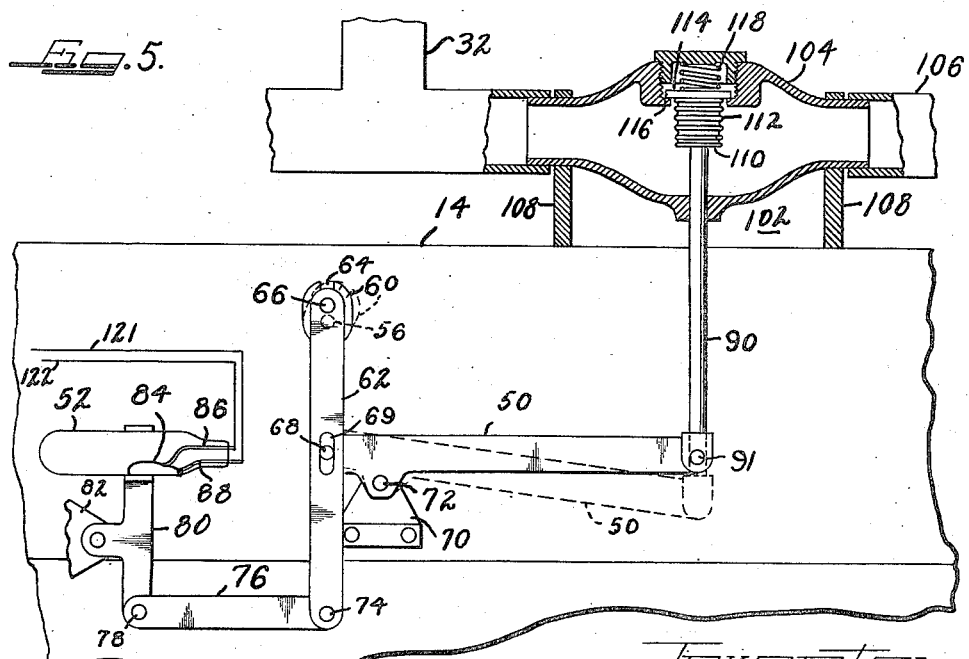

Patented Jan. 9, 1951

2,537,121

UNITED STATES PATENT OFFICE 2,537,121

TEMPERATURE REGULATING SYSTEM

Bruce G. Copping, Atlanta, Ga., assignor to Don Manufacturing Company, Chicago, Ill., a corporation of Illinois Application May 12, 1947, Serial No. 747,469

2 Claims. (Cl. 236—1)

My invention relates to ventilating systems of the type wherein hot or cold air is forced under pressure into spaces to be ventilated and controls therefor.

In one method of ventilating a building or the like, air under pressure is supplied through ducts to the various spaces desired to be maintained at predetermined temperature. Individual thermostatically controlled shutters are provided in the air ducts feeding each of the separate spaces so as to control the entrance of cool or warm air to each space in accord with the temperature thereof and thus maintain that temperature at a desired value. Thus the air temperatures within the separate spaces are individually and automatically maintained at preselected values despite the fact that the air requirements of the various spaces may vary with time and as between each other. In the aforementioned systems, however, the control exerted by the thermostatically controlled shutters is limited by the temperature of the air in the ducts which they control. For example, in a heating system if the air temperature in the duct is below a predetermined value as compared to the heat transfer from a space heated, the shutter to that space opens wide but is nevertheless incapable of causing a sufficient amount of air flow to the space to overcome the heat loss and raise the space to the desired temperature. If, on the other hand, the temperature of the air in the ducts is excessively high as compared to the heat loss from a space, it becomes impossible for the shutter to restrain the temperature in the space from reaching excessive values even though it closes for the reason that the heat flow to the space by reason of air leakage through the shutter, convection and radiant heat transfer from the shutter, duct, and adjacent wall to the room, together with heat flow from the furnace through the flooring, etc., exceeds the heat loss at the desired temperature of the space. For these reasons, the ability of a system incorporating only thermostatically controlled shutters and operating at a specific duct air temperature is limited.

In accordance with the present invention, the working air temperature of a heating or cooling system is modulated or controlled in accord with the temperature of the outside or ambient air. This temperature control is achieved in such fashion as to tend to overcome the effect of the variations in heat transfer to or from these spaces associated with outside air temperature changes and thereby tend to maintain the required air flow to the spaces at values that permit control by the shutter. In the heating system specifically described herein, for example, means are provided to alter the application of fuel to the furnace in accord with the outside air temperature so that as that temperature increases in value, the fuel supply is reduced and the temperature of the heated furnace air accordingly diminished. The quantity of air flow to each space necessary to maintain constant temperature therein, is thus increased as compared with the value that would be required in the event that the fuel supply was maintained constant. Thus the normal tendency of an increase in outside air temperature to cause a decrease in the amount of air supplied to each of the spaces is overcome to some extent and the limit over which the entire sytem is capable of maintaining the predetermined temperatures in the spaces is increased accordingly.

It is accordingly a general object of the present invention to provide an improved ventilating system and control therefor capable of adjusting the temperature of the controlled air applied to the spaces heated or cooled in accord with the outside air temperature, to the end that the air flow to the spaces shall be maintained at values capable of control by the various shutters.

A more specific object of the present invention is to provide an improved mechanism capable of attachment to the fuel regulating system of a conventional heating or cooling system to control the heat or cooling thereof in accord with the outside temperature.

A further object of the present invention is to provide an improved ventilating system and control therefor that may be applied to conventional heating and cooling systems with minimum difficulty.

Yet another object of the present invention is to provide an improved mechanism for use in a forced hot air heating system to control the heat input thereto in accord with the outside air temperature and which is of simple and rugged construction and capable of mounting on a conventional hot air furnace.

Further it is an object of the present invention to provide an improved mechanism for attachment to the air heating or cooling system that has features of construction, combination, and arrangement, whereby a simple and effective means is provided that is rugged and reliable in operation and inexpensive to manufacture, to the end that a unit of maximum utility be provided.

The novel features which I believe to be characteristic of my invention are set forth with particularity in the appended claims. My invention, itself, however, both as to its organization and method of operation, together with further objects and advantages thereof, may best be understood by reference to the following description taken in connection with the accompanying drawings.

On the drawings:

Figure 1 is a somewhat diagrammatic view showing a warm air heating furnace of the forced air type with piping connections to a plurality of spaces to be heated, together with a temperature regulating system of one type contemplated by the present invention;

Figure 2 is a transverse section view of a control shutter of one type that may be utilized to control the air flow to the spaces ventilated by the heating system of Figure 1;

Figure 3 is a fragmentary view of a system similar to that of Figure 1 but modified for air cooling rather than air heating;

Figure 4 is a fragmentary view showing a furnace equipped with an alternative form of the present invention;

Figure 5 is an enlarged view of the regulating mechanism of the embodiment shown in Figure 4; and Figure 6 is a fragmentary view of the bimetal control element of the control of the system of Figures 4 and 5.

As shown on the drawings:

Figure 1 shows a warm air heating system in which the spaces to be heated are indicated diagrammatically at 10 and 12, respectively, these constituting, for example, the separate rooms of a home. The furnace for supplying hot air to these spaces is shown generally at 14 and may include, for example, an oil burner 16 to which fuel and air is supplied by the unit 18 which includes an electric motor connected to drive a fuel pump and air blower. Fan 20 is provided to force cool air into the bonnet or heating chamber of furnace 14 so as to cause egress of heated air from the bonnet to ducts 22 and 24. Air from duct 22 is applied to thermostatically controlled ventilator 26 so as to pass into space 10. Similarly, air from duct 24 passes through thermostatically controlled ventilator 28 to space 12. Exhaust air from spaces 10 and 12 passes to return duct 30 from pipes 32 and 34, respectively, and thus travels to fan 20 to be recirculated through the system. If desired, returned duct 30 may be in communication with the exterior of the building for the admission of some fresh or make-up air.

It is the function of ventilators 26 and 28 to control the flow of heated air to spaces 10 and 12 in accord with the temperatures therein. One method of accomplishing this operation will be evident from examination of Figure 2 which is a transverse section view showing the construction of one type of ventilator that may be used for this purpose, this figure showing shutter 26 for purposes of illustration. This ventilator includes vane 38 which is supported to rotate about axis 40, this rotation being determined by a thermostatic control system (not shown) responsive to the air temperature within space 10. As vane 38 is closed and opened by rotation of shaft 40, the air flow to space 10 is accordingly controlled and the temperature therein established.

In the shutters 26 and 28 means are provided automatically to open and close the vanes in accord with the temperature of spaces 10 and 12 respectively. This means may, for example, include a spring or other device to bias the shutter to an open position and mechanism to overcome the biasing action in accord with the room temperature, the effect of this mechanism increasing as the room temperature rises. This increased room temperature causes decreased hot air flow thereto and the shutter operates to tend to maintain constant room temperature.

As the outside air temperature varies, the heat requirements in the spaces 10 and 12 vary accordingly and the vane 38, Figure 2, alters its position as necessary to maintain constant the temperature in space 10. Simultaneously, the vanes of the shutters controlling the hot air supply to other spaces undergo like action with the result that the total air flow through the system is reduced. So long as the variation in outside air temperature is small, the shutters are capable of altering the air flow to the degree required to maintain the spaces at the desired temperatures. However, if the outside air temperature increases greatly, the shutters, even in the closed position, are incapable of maintaining the temperature in spaces 10 and 12 at the desired value for the reason that leakage air flow through them, together with radiant and convection heat transfer from the ducts and adjacent hot walls, the shutters themselves, and the furnace and adjacent hot flooring, cause so much heat flow to the spaces that it is impossible to prevent the temperature from rising above the predetermined level. Conversely, if the outside air temperature decreases the shutters 26 and 28 open and cause a greater flow of heated air to the spaces 10 and 12 to overcome the effects of the greater heat losses from these rooms associated with the decreased outside air temperature. However, if the change in outside air temperature is very great the air flow through the shutters even in the open position, is incapable of overcoming these effects and the temperatures in these spaces fall below the predetermined values. It is thus evident that while the shutters are capable of maintaining the predetermined temperatures within spaces 10 and 12 over a reasonable variation in outside air temperatures that if this temperature varies to an excessive degree in either direction, it becomes impossible to maintain these temperatures as desired.

The aforementioned difficulties are particularly severe if for one reason or another the heat requirements of spaces 10 and 12 differ greatly as compared to the ability of the shutters 26 and 28 to supply the necessary air. If, for example, with a particular outside air temperature, the nature of the heat loss from space 10 is such that the shutter 26 is relatively closed and the nature of the heat loss from space 12 is such that the shutter 28 is relatively open, a relatively small increase in outside air temperature is required completely to close shutter 26 and a relatively small decrease in outside air temperature is required completely to open shutter 28. When these changes occur, temperature control is lost in at least one of the spaces 10 and 12 and the system becomes ineffective in achieving its intended purpose.

It is the function of the control mechanism shown generally at 42, Figure 1, to vary or modulate the temperature of the air within the bonnet of furnace 14 so as to enable the thermostatically controlled shutters to maintain predetermined temperatures within spaces 10 and 12 even though the outside temperature varies over relatively wide limits. To this end, a bellows 44 is provided, this bellows being supported from the furnace by bracket 45. In fluid communication with the interior of these bellows is a pipe 47 which is connected to a bulb 48 inserted into the interior of the bonnet portion of furnace 14 to partake of the temperature of the air therein. Likewise in fluid communication with the bellows 44 is a pipe 49 which extends through outside wall 35 to outside bulb 37. The latter is encased in a protective enclosure 39 which permits free air flow thereabout and enables it to partake of the outside air temperature without being subjected to physical damage. The end plate 43 on bellows 44 is connected to arm 89 which is pivotally connected to arm 51. Arm 51 is in turn pivotally supported by bracket 71 to rotate about the pin 73. Mercury switch 52 having electrodes 86 and 88 is attached to the remote end of arm 51 so that as bellows 44 extends and contracts, the mercury ball 84 within switch 52 rolls to connect or disconnect the contacts 86 and 88.

The contacts 86 and 88 of mercury switch 52 are connected to terminal 121 and to lead 122 respectively. The former is connected to a source of energizing power for the motor portion of unit 18 and the latter is connected to one terminal of the motor portion of unit 18. Lead 120 connects the other terminal of the motor portion of unit 18 to terminal 123 which is connected to the other side of the source of energizing power. Thus as switch 52 is shifted to cause drop 84 to connect or disconnect the contacts 86 and 88 the application of heat to furnace 14 is started or stopped.

The space within the bellows 44, pipes 47 and 49 and bulbs 48 and 37, is filled with a fluid such as a volatile liquid that expands with increased temperature and contracts with decreased temperature. Thus, as the temperature of bulb 48 or bulb 37 is decreased the bellows 44 contracts, thereby raising arm 89. Conversely, if the temperature of bulb 48 or bulb 37 increases the bellows 44 expands thereby depressing arm 89.

The operation of the system of Figure 1 may best be understood by first considering the events following increase in the air temperature within the bonnet portion of furnace 14. In this case, the bulb 48 partakes of the temperature increase, thereby expanding the fluid contained within that bulb and causing the bellows 44 to extend. This causes arm 89 to drop, thereby rotating arm 51 in the clockwise direction as seen in Figure 1 and rotating mercury control switch 52 in direction to cause the mercury ball 84 to flow away from the contacts 86 and 88 and interrupt the application of energizing power to unit 18. The heat supplied to the furnace 14 is thereby discontinued and the air temperature in the bonnet portion thereof is accordingly reduced. Should the air temperature within the bonnet portion of furnace 14 fall below a predetermined minimum, the reverse effects take place, bulb 48 partaking of this decreased temperature to cause the mercury switch 52 to shift in direction to cause the mercury ball 84 to connect contacts 86 and 88 to apply heat to the furnace 14.

It is thus evident that the bulb 48 acts in conjunction with the bellows 44 to maintain the temperature in the bonnet portion of furnace 14 in the range between a predetermined upper limit and a predetermined lower limit. These limits are spaced by a temperature difference determined by the frictional opposition to motion of the mercury drop 84 and the linkage, together with the lost motion in the system.

The effect of bulb 37 and pipe 49 is to alter the predetermined temperatures between which the bulb 48 and bellows 44 maintain the temperature in the bonnet portion of furnace 14. If, for example, the outside air temperature increases, the bulb 37 partakes of the temperature increase and the bellows 44 is extended below the position it would assume had no increase in outside temperature taken place. This shifts mercury switch 52 in the direction to disconnect the terminals 86 and 88 and thereby reduces the application of heat energy to furnace 14. However, as the air in the bonnet portion of furnace 14 cools, the bulb 48 partakes of the reduced temperature and eventually bellows 44 contracts to the point where the mercury ball 84 in switch 52 again makes contact between leads 86 and 88 and the fuel is again supplied to the furnace 14. Thus an increase in temperature of the outside bulb 37 decreases the temperature at which the mercury ball 84 causes contact between electrodes 86 and 88. Similarly an increase in outside temperature decreases the temperature within the bonnet of furnace 14 at which the bulb 48 causes the ball 84 to disconnect the electrodes 86 and 88. Thus the outside bulb 37 acts to modulate or control the temperature range within which the air in the bonnet of furnace 14 is maintained in accord with the outside air temperature, the bonnet temperature being decreased as the outside air temperature is raised.

If the outside air temperature decreases, the bulb 37 partakes of the decreased temperature and causes the bellows 44 to collapse as compared to the position that would be assumed in the absence of the outside air temperature changes. This exerts an effect opposite to that above described in connection with an outside air temperature increase and increases the value of the temperature range within which the mercury switch 52 maintains the bonnet air temperature.

The operation of the complete system of Figure 1 may now be described. If, for example, the outside air temperature rises, the heat loss from spaces 10 and 12 is reduced and the shutters 26 and 28 tend to close. Simultaneously, however, the temperature within the bonnet of furnace 14 is reduced so that the heat content of the air passing through shutters 26 and 28 is accordingly made less and a greater amount of air flow is required to accomplish the same heating of the spaces 10 and 12 are compared with the required quantity at the previous air temperature. The shutters 26 and 28 accordingly do not close to the extent they would otherwise close but maintain themselves in a more nearly open position. Conversely, if the outside air temperature decreases the air temperature within the bonnet of furnace 14 is raised and the increased air flow through shutters 26 and 28 is reduced by the fact that this air has a greater heat content per unit of volume.

In Figure 3 the temperature regulating system of Figure 1 is shown as it may be adapted for use in an air cooling system. In this case the mercury switch 52 is mounted in a reverse position from that shown in Figure 1 so that the contacts are connected when the bellows 44 extends. Thus, as the air temperature within the bonnet of furnace 14 is increased above a predetermined maximum value, the contacts are connected and when the air temperature goes below a predetermined minimum the contacts are disconnected.

In the system of Figure 3, leads 120 and 122 lead to motor 124 which is operatively connected to compressor 126 to compress a refrigerating fluid which is subsequently cooled in cooler 128. The fluid then flows to expansion valve 130 through cooling coil 132 and then returns to compressor 126. Cooling coil 132 is located in the bonnet 58 of the furnace 14 so that air passing therethrough is cooled. Since the cooling of the air in the bonnet of furnace 14 is dependent upon the application of power to motor 124 from leads 120 and 122, it will be evident that in the system of Figure 3, the mechanism 42 operates to maintain the air temperature within the bonnet of furnace 14 within predetermined limits, the value of these limits being determined by the outside air temperature by means of the bulb 37.

In the system of Figure 3, the individual shutters controlling application of cooling air to the separate spaces are constructed to oppose the air flow to an increased degree as the temperature of the spaces cooled is reduced. A mechanism of the type shown in Figure 2 may be used for this purpose but the control elements (not shown) must be disposed to close vane 38 as the air temperature within the space decreases.

In the apparatus of Figure 3, should the outside air temperature increase, the fluid within bulb 37 would expand and the bellows 44 would accordingly assume a more expanded position at every temperature within the bonnet of furnace 14 than the position in the absence of the increased outside air temperature. The limits between which the temperature in the bonnet of furnace 14 is regulated are accordingly reduced and the cooling effect of the air from this bonnet increased accordingly. Since in the air cooling system an increase in outside air temperature demands a greater flow of cooling air, the unit 42 acts to overcome or to compensate for this effect by increasing the cooling value of the air that does flow and thereby diminishing the amount of the change in quantity of air flow.

Figures 4 and 5 show a modification of the present invention in which the control unit shown generally at 102 is substituted for the structure of the previously described embodiment. The unit 102 comprises an enlarged pipe section 104 located in a duct 106 provided to convey outside or ambient air from the entrance 36 to the fan 20. This air flow acts to maintain the interior of pipe 104 at ambient outside temperature and further supplies fresh air to make up for losses in the heating system.

The pipe 104 is supported from the enclosure of the bonnet portion of furnace 14 by supports 108 and is shown in enlarged cross-sectional view in Figure 5. As will be evident from the latter figure, rod 90 passes through the lower portion of pipe 104 and is connected at its upper end to the end plate 110 of bellows 112. Bellows 112 are held in place from the upper plate 114 which is held in engagement with the flange 116 of pipe 104 by spring 118. Bellows 112 are completely enclosed so as to entrain a constant quantity of fluid which expands or contracts in accord with the air temperature in pipe 104.

The various component elements of the structure of Figures 4 and 5 corresponding to the elements shown in Figure 1 are identified with like numerals and perform like functions.

The details of the mechanism of Figure 4 may best be understood by reference to Figures 5 and 6, the former being an enlarged view of the control mechanism and the latter being a fragmentary sectional view showing the disposition of the thermostatic element within the bonnet portion of furnace 14. In Figure 6, the numeral 54 represents a bimetallic thermostatic control element comprising a coil 55 attached at one end to the housing of furnace 14 and at the other end to rod 56 so as to rotate that rod in accord with the temperature of the air in furnace bonnet region 58, rod 56 being rotated in the counterclockwise direction with increased temperature. The rod 56 extends through the furnace 14 and terminates in fork 60, which is best seen in the enlarged elevational view of Figure 5. Lever arm 62, Figure 5, is connected to the slot 64 in fork 60 by pin 66. This lever arm is further supported from the housing of furnace 14 by pin 68 which rides in slot 69 of arm 62 and is supported on lever arm 50. The latter arm is rotatably supported on bracket 70 by pin 72. At the opposite end of arm 62, pin 74 is provided to secure a rotatable attachment thereof with link 76. Lever arm 76 is connected through pin 78 to arm 80 which rotatively supports mercury switch 52 from bracket 82.

The above described elements operate to energize the motor of pump and fan 18 in accord with the temperature in bonnet 58 so as to maintain that temperature between a predetermined range of values. Thus, for example, as the air temperature in bonnet 58 increases above a predetermined fixed value, fork 60 is rotated by shaft 56 in the counterclockwise direction as seen in Figure 5, thereby tending to rotate lever arm 62 in the counterclockwise direction about pin 68 and causing similar counterclockwise motion of lever arm 80. This causes the mercury drop 84 within switch 52 to roll away from the electrodes 86 and 88 to interrupt the electrical connection therebetween and deenergize unit 18 to discontinue the application of heat to furnace 14. If the air temperature in bonnet 58 decreases below a predetermined fixed minimum, the reverse action takes place and heat is applied to the furnace 14. Thus, the switch 52 is opened and closed in accord with the temperature in the bonnet 58 and the temperature therein is maintained above a predetermined minimum value and below a predetermined maximum value.

It is the function of arm 90 and bellows 110 to alter the range of temperature values within which the air temperature in bonnet 58 of furnace 14 is controlled. To this end, the bellows 112 are located within the pipe 104 to partake of the outside air temperature as the outside air is induced through this pipe for supplying the losses of the air heating system. The plate 110 of bellows 112 is connected to arm 90 which is in turn pivotally connected at pivot 91 to arm 50 which at its remote end contains pin 68 which pivotally supports arm 62. The arm 50 is pivotally supported by pin 72 from bracket 70 on furnace 14.

If, for example, the temperature of the outside air increases, the fluid within bellows 112 expands, thereby depressing arm 90, as seen in the dotted lines of Figure 5. This tends to shift arm 62 to the right, as seen in Figure 5, thereby rotating mercury switch 52 in direction to disconnect contacts 86 and 88 and interrupt the fuel supplied to furnace 14. It is thus necessary for the fork 60 to rotate to the lower temperature position, shown in the dashed lines of Figure 5 before causing the contacts 86 and 88 of switch 52 to be connected. It is thus evident that the effect of the increase outside temperature is to reduce the minimum temperature at which the contacts 86 and 88 are connected for application of increased heat to furnace 14. Similarly, as the outside air temperature decreases, the bellows 112 compress and the temperature at which the contacts 86 and 88 of bellows 52 are disconnected is raised. Thus, the unit of Figures 4, 5 and 6 operates in a manner similar to that of the system of Figure 1 to increase the values of air temperature in the bonnet of the furnace 14 with decreased outside air temperature and to decrease the temperature values within the bonnet of furnace 14 with increased outside air temperature.

It will be evident to those skilled in the art that I have provided an improved heating system wherein the temperatures of the separate spaces to be controlled are maintained at predetermined values by reason of appropriate thermostatically controlled shutters and the temperature of the air supplied to the shutters is varied in accord with the outside temperature to extend the limits over which the shutter control is effective. That is, as the outside air temperature falls, the heat content of the air supply is increased so that the change in air volume to the spaces heated is reduced. Similarly, as the outside air temperature rises, the heat content of the air supply is decreased and the change in air volume to the spaces heated likewise reduced. In addition to extending the limits over which the system is effective in maintaining the preselected air temperatures in the spaces controlled, it will be evident that the system of the present invention acts to extend the sensitivity of the temperature control for the reason that the motion of the shutters 26 and 28 is reduced for any predetermined change in outside temperature and therefore the amount of inside temperature change necessary to produce the required movement of the shutters is correspondingly reduced. I thus am not only enabled to increase the temperature ranges over which the system is effective but in addition I achieve a more precise temperature control.

While I have shown particular embodiments of my invention, it will, of course, be understood that I do not wish to be limited thereto since many modifications, both in the elements used and their cooperative combination, may be made without departing from the spirit and scope of my invention. I, of course, contemplate the appended claims to cover all such modifications that fall within the true spirit and scope of my invention.

I claim as my invention:

1. In a regulator for use in an air temperature conditioning system wherein a plurality of individual thermostatically controlled shutters control air flow from a heat exchanger having an electrically controlled temperature varying source, the improvement of a temperature sensitive bellows in communication with atmospheric temperatures, a volatile liquid charge for filling said bellows, a bimetallic thermostat in communication with temperature of the air flowing from the heat exchanger, a fork and pin mechanism associated with said thermostat to translate expansive movements of said bimetallic thermostat into angular displacements, a switching means in control of said heat exchanger, a first leverage mechanism having a lever arm rotatably connected with fork and pin of said bimetallic thermostat and defining a centrally disposed longitudinal slot for variable cooperation with a fulcrum, a second leverage mechanism having one lever arm pivotally mounted on a fixed fulcrum and a pin on one end to act as a variable fulcrum for cooperating engagement with said longitudinal slot of said first leverage mechanism, said lever arm pivotally connected with another lever arm connected to said bellows, and a linkage device associated with said first and second leverage mechanism and said switching means operable to actuate said temperature varying source in response to variations in the temperature gradient between prevailing atmospheric temperatures and the temperature of the air flowing from the heat exchanger.

2. In thermostatic control means for temperature conditioning and distributing air systems of the type having an operating lever system and a plurality of temperature responsive elements having connections with said lever system for setting it differentially in accordance with differential temperature environments surrounding each of said temperature responsive elements, the improvement of a bimetallic element for one of said temperature responsive elements being responsive to temperature of the air to be distributed, a bellows containing an expansible fluid for another of said temperature responsive elements being responsive to the prevailing atmospheric temperature, lever means connected with said bellows and said bi-metallic element, said bellows operable to alter the lever ratio of said lever means by shifting the pivot point thereof, and a switching means, said bi-metallic unit and said bellows together operable to control said switching means in response to variation in the temperature gradient between the air to be distributed and the atmosphere.

BRUCE G. COPPING.

REFERENCES CITED

The following references are of record in the file of this patent:

UNITED STATES PATENTS

| Number | Name | Date |
|---|---|---|
| 1,785,426 | Raymond | Dec. 16, 1930 |
| 1,826,100 | Stewart | Oct. 6, 1931 |
| 2,024,625 | Campbell | Dec. 17, 1935 |
| 2,025,097 | Dougherty | Dec. 24, 1935 |
| 2,063,613 | McCarthy | Dec. 8, 1936 |
| 2,076,146 | James | Apr. 6, 1937 |
| 2,177,597 | Haines | Oct. 24, 1939 |
| 2,241,108 | Akers | May 6, 1941 |